United States Patent
Tseng et al.

(10) Patent No.: US 7,957,282 B2
(45) Date of Patent: Jun. 7, 2011

(54) METHOD AND APPARATUS FOR IMPROVING MIMO OPERATION IN A WIRELESS COMMUNICATIONS SYSTEM

(75) Inventors: Li-Chih Tseng, Taipei (TW); Yu-Hsuan Guo, Taipei (TW)

(73) Assignee: Innovative Sonic Limited, Port Louis (MU)

( * ) Notice: Subject to any disclaimer, the term of this patent is extended or adjusted under 35 U.S.C. 154(b) by 320 days.

(21) Appl. No.: 12/048,231

(22) Filed: Mar. 14, 2008

(65) Prior Publication Data

US 2008/0225966 A1 Sep. 18, 2008

Related U.S. Application Data

(60) Provisional application No. 60/894,695, filed on Mar. 14, 2007.

(51) Int. Cl.
*H04J 3/16* (2006.01)
(52) U.S. Cl. .......................... 370/230; 370/437; 370/468
(58) Field of Classification Search .................. 370/252, 370/310, 328, 329, 342, 335
See application file for complete search history.

(56) References Cited

U.S. PATENT DOCUMENTS

| | | | |
|---|---|---|---|
| 2004/0081181 A1 | 4/2004 | Malkamaki | |
| 2007/0025300 A1 | 2/2007 | Terry | |
| 2007/0036108 A1 | 2/2007 | Benoist | |
| 2009/0106619 A1* | 4/2009 | Onggosanusi et al. | 714/749 |
| 2010/0067459 A1* | 3/2010 | Goransson et al. | 370/329 |

FOREIGN PATENT DOCUMENTS

| | | |
|---|---|---|
| EP | 1 708 524 A1 | 10/2006 |
| JP | 2004536505 A | 12/2004 |
| JP | 2006115358 A | 4/2006 |
| JP | 2006246457 A | 9/2006 |
| JP | 2006345501 A | 12/2006 |
| JP | 200822561 A | 1/2008 |
| JP | 2008541596 A | 11/2008 |
| KR | 20030067412 A | 8/2003 |
| KR | 20030079631 | 10/2003 |
| KR | 1020060121868 A | 11/2006 |
| KR | 100663278 | 1/2007 |
| KR | 1020070021725 A | 2/2007 |
| KR | 1020070055004 | 5/2007 |
| KR | 1020080084059 A | 9/2008 |

(Continued)

OTHER PUBLICATIONS

3GPPUniversal Mobile Telecommunications System(UMTS); Multiplexing and channel coding (FDD)(3GPP TS 25.212 version 7.4.0 Release 7), Mar. 2003, cover page plus p. 1-101, XP014037877, ETSI,Sophia Antipolis Cedex-France.

(Continued)

*Primary Examiner* — Seema S Rao
*Assistant Examiner* — Mon Cheri S Davenport (57) ABSTRACT

In order to improve Multi-input Multi-Output (MIMO) operation, the present invention provides a method of improving MIMO operation for a user equipment (UE) in a wireless communications system. The method includes receiving a first value according to a number of hybrid automatic repeat request (HARQ) processes in a HARQ procedure for the UE, receiving a first HARQ process identifier corresponding to a primary transport block, and assigning a second HARQ process identifier corresponding to a secondary transport block to be equal to (H+(N/2)) mod (N), wherein H represents the first HARQ process identifier, mod represents modulus arithmetic, and N represents the first value.

12 Claims, 6 Drawing Sheets

FOREIGN PATENT DOCUMENTS

| | | |
|---|---|---|
| WO | 03001681 | 1/2003 |
| WO | 2006120540 A1 | 11/2006 |
| WO | 2006126079 A2 | 11/2006 |
| WO | 2008050453 A1 | 5/2008 |
| WO | WO2008050453 A1 | 5/2008 |

OTHER PUBLICATIONS

Philips, Harq process handling for Rel-7 FDD MIMO, Jan. 15-19, 2007, 3GPP TSG RAN WG2 Meeting #56 bis, Tdoc R2-070289,XP050133378, Sorrento,Italy.

R1-071183 3GPP TSG-RAN WG1 Meeting #48, "Introduction of 16QAM for HSUPA", Feb. 2007.

R2-071085 3GPP TSG-RAN WG2 Meeting #57, "Introduction of 16QAM in 25.321", Feb. 2007.

R2-071089 3GPP TSG-RAN WG2 Meeting #57, "Introduction of 64QAM in MAC specification", Feb. 2007.

R2-071092 3GPP TSG-RAN WG2 Meeting #57, "Proposed CR to TS 25.331 [Rel-7] on Introducing MIMO in RRC specification", Feb. 2007.

3GPP TS 25.331 V7.3.0 (Dec. 2006), "Radio Resource Control (RRC) Protocol Specification (Release 7)", P314, P580, P581.

3GPP TS 25.321 V7.3.0 (Dec. 2006), "Medium Access Control (MAC) protocol specification (Release 7)".

Universal Mobile Telecommunications System(UMTS); Medium Access Control (MAC) protocol specification (3GPP TS 25.321 version 7.4.0 Release 7), Mar. 2007, cover page plus p. 1-131, XP014037915, ETSI, Sophia Antipolis Cedex-France.

Ericsson, "Signaling of Transport Block Sizes for HS-DSCH", 9.2.2, Jun. 24-27, 2002, p. 1-13, TSG-RAN WG2 #30,Tdoc R2-0221668,XP 050096610,Turin, Italy.

Samsung,"Mapping between transport block size and 6-bit index value", Feb. 18-22, 2002,p. 1-4, 3GPP TSG-RAN WG2 meeting#27,Tdoc R2-020384,XP050119993,Orlando, U.S.A.

Qualcomm Europe, Ericsson, Motorola, Philips, Alcatel-Lucent, Samsung, Introduction of 16QAM for HSUPA, 3GPP TSG-RAN WG1 Meeting #48, R1-071184, Feb. 12, 2007.

Ericsson, MIMO impacts on MAC in HSPA, TSG-RAN WG2 Meeting #56, Tdoc R2-063211, Riga, Latvia Nov. 6-10, 2006.

Ericsson, HS-SCCH part 2 for UTRA MIMO, 3GPP TSG-RAN WG1 #48, R1-071081, St Louis, MO, USA, Feb. 12-16, 2007.

* cited by examiner

METHOD AND APPARATUS FOR IMPROVING MIMO OPERATION IN A WIRELESS COMMUNICATIONS SYSTEM

CROSS REFERENCE TO RELATED APPLICATIONS

This application claims the benefit of U.S. Provisional Application No. 60/894,695, filed on Mar. 14, 2007 and entitled "Method and Apparatus for Improving the Performance of High Order Modulation and MIMO in HSPA", the contents of which are incorporated herein by reference.

BACKGROUND OF THE INVENTION

1. Field of the Invention

The present invention relates to a method and related apparatus for improving Multi-input Multi-Output (MIMO) operation for a user equipment in a wireless communications system, and more particularly, to a method and related apparatus for improving MIMO operation according to a configuration of a Hybrid Automatic Repeat Request (HARQ) process identifier corresponding to a secondary transport block.

2. Description of the Prior Art

The third generation (3G) mobile telecommunications system has adopted a Wideband Code Division Multiple Access (WCDMA) wireless air interface access method for a cellular network. WCDMA provides high frequency spectrum utilization, universal coverage, and high quality, high-speed multimedia data transmission. The WCDMA method also meets all kinds of QoS requirements simultaneously, providing diverse, flexible, two-way transmission services and better communication quality to reduce transmission interruption rates. Through the 3G mobile telecommunications system, a user can utilize a wireless communications device, such as a mobile phone, to realize real-time video communications, conference calls, real-time games, online music broadcasts, and email sending/receiving. However, these functions rely on fast, instantaneous transmission. Thus, targeting the third generation mobile telecommunication technology, the prior art provides High Speed Package Access (HSPA) technology, which includes High Speed Downlink Package Access (HS-DPA) and High Speed Uplink Package Access (HSUPA), to increase bandwidth utility rate and package data processing efficiency to improve uplink/downlink transmission rate.

HSDPA and HSUPA adopt Hybrid Automatic Repeat Request (HARQ) technology to enhance retransmission rate and reduce transmission delay. HARQ is a technology combining Feed-forward Error Correction (FEC) and ARQ methods, which makes a Universal Terrestrial Radio Access Network (UTRAN) trigger retransmission according to positive/negative acknowledgement signals (ACK/NACK) transmitted from a user equipment (UE), and the UE stores useful information about the last failed transmission for later use.

To further increase the downlink data rate, 3GPP introduces a Multi-input Multi-Output (MIMO) technology, with which a UE and a base station, known as a Node-B, utilize multiple antennas to transmit/receive radio signals. The MIMO technology can be further integrated with spatial multiplexing, beam forming and spatial diversity technologies to reduce signal interference and increase channel capacity. To control the MIMO operation of the UE, the UTRAN can set configuration of MIMO operation in radio resource control (RRC) messages with information elements (IEs) in a RRC protocol layer, and send the RRC messages to the UE through corresponding RRC procedures. Correspondingly, the UE uses a MIMO_STATUS variable for storing received parameters. When the MIMO_STATUS variable is set to "TRUE", the MIMO operation is configured.

When the UE is not configured in the MIMO operation, the UE can only receive one transport block on a High Speed Physical Downlink Shared Channel (HS-PDSCH) in one Transmission Time Interval (TTI). A HARQ procedure for the UE includes 8 HARQ processes at most and each of the HARQ processes is configured to a HARQ process identifier, which is represented by an integer between 0 and 7. The UE partitions the soft memory buffer according to the HARQ process identifier. On the other hand, when the UE is configured in the MIMO operation, the UE can receive two transport blocks on the HS-PDSCH in one TTI, and a number of the HARQ processes of the HARQ procedure increases to 16 at most. The number of the HARQ processes, $N_{proc}$, is defined in an IE "Number of Process". After the UE receives an IE "Number of Process", the UE assigns all of the HARQ process identifiers of the $N_{proc}$ HARQ processes for 0 to ($N_{proc}$−1). For example, if $N_{proc}$=6, the HARQ process identifiers are assigned for 0 to 5, and if $N_{proc}$=12, the HARQ process identifiers are assigned for 0 to 11.

Moreover, when the UE is configured in the MIMO operation, the mapping relationship between the HARQ processes and the transport blocks is that when a HARQ process with a HARQ process identifier H is mapped to the primary transport block, a HARQ process with a HARQ process identifier given by ((H+8) mod 16) shall be mapped to the secondary transport block. For example, if the HARQ process with a HARQ process identifier 0 is mapped to the primary transport block, the HARQ process with a HARQ process identifier 8 is given to the secondary transport block.

Note that, when $N_{proc} \leq 8$, even if the UE is configured in the MIMO operation, the number of the HARQ processes that are used for receiving the secondary transport blocks is still 0. Take $N_{proc}$=6 for example and follow the mapping described above, the 6 HARQ processes with HARQ process identifiers 8 to 13 are mapped to the secondary transport blocks. However, all of the 6 HARQ process identifiers are assigned for 0 to 5, therefore the UE cannot configure the HARQ processes with HARQ process identifiers 8 to 13. In other words, even if the UE is configured in the MIMO operation, the UE cannot receive two transport blocks on the HS-PDSCH in one TTI when $N_{proc} \leq 8$.

SUMMARY OF THE INVENTION

The present invention provides a method and related apparatus for improving MIMO operation for a UE in a wireless communications system.

The present invention discloses a method of a method of improving MIMO operation for a UE in a wireless communications system, the method includes receiving a first value according to a number of HARQ processes in a HARQ procedure for the UE, receiving a first HARQ process identifier corresponding to a primary transport block, and assigning a second HARQ process identifier corresponding to a secondary transport block to be equal to (H+(N/2)) mod (N), wherein H represents the first HARQ process identifier, mod represents modulus arithmetic, and N represents the first value.

The present invention further discloses a communications device used in a wireless communications system for improving MIMO operation, the communications device includes a control circuit for realizing functions of the communications device, a central processing unit installed in the control circuit for executing a program code to operate the control circuit, and a memory coupled to the central processing unit for storing the program code. The program code includes a means for receiving a first value according to a number of HARQ processes in a HARQ procedure for the communications device, a means for receiving a first HARQ process identifier corresponding to a primary transport block, and a means for assigning a second HARQ process identifier corresponding to a secondary transport block to be equal to (H+(N/2)) mod (N), wherein H represents the first HARQ process identifier, mod represents modulus arithmetic, and N represents the first value.

The present invention further discloses a method of a method of improving MIMO operation for a UE in a wireless communications system, the method includes receiving a first HARQ process identifier corresponding to a primary transport block, and assigning a second HARQ process identifier corresponding to a secondary transport block to be equal to (H+M), wherein H represents the first HARQ process identifier and M represents a value.

The present invention further discloses a communications device used in a wireless communications system for improving MIMO operation, the communications device includes a control circuit for realizing functions of the communications device, a central processing unit installed in the control circuit for executing a program code to operate the control circuit, and a memory coupled to the central processing unit for storing the program code. The program code includes a means for receiving a first HARQ process identifier corresponding to a primary transport block, and a means for assigning a second HARQ process identifier corresponding to a secondary transport block to be equal to (H+M), wherein H represents the first HARQ process identifier and M represents a value.

The present invention further discloses a method of improving MIMO operation for a UE in a wireless communications system, the method includes receiving a first HARQ process identifier corresponding to a primary transport block, and assigning a second HARQ process identifier corresponding to a secondary transport block to be equal to $(N_{proc}-H-1)$, wherein $N_{proc}$ represents a number of HARQ processes in a HARQ procedure for the UE, and H represents the first HARQ process identifier.

The present invention further discloses a communications device used in a wireless communications system for improving MIMO operation, the communications device includes a control circuit for realizing functions of the communications device, a central processing unit installed in the control circuit for executing a program code to operate the control circuit, and a memory coupled to the central processing unit for storing the program code. The program code includes a means for receiving a first hybrid automatic repeat request (HARQ) process identifier corresponding to a primary transport block, and a means for assigning a second HARQ process identifier corresponding to a secondary transport block to be equal to $(N_{proc}-H-1)$, wherein $N_{proc}$ represents a number of HARQ processes in a HARQ procedure for the communications device, and H represents the first HARQ process identifier.

The present invention further discloses a method of improving MIMO operation for a UE in a wireless communications system, the method includes assigning to HARQ processes identifiers from 0 to $((N_{proc}/2)-1)$ and from 8 to $((N_{proc}/2)+7)$, wherein $N_{proc}$ represents a number of HARQ processes in a HARQ procedure for the UE and $N_{proc}$ is an even integer.

The present invention further discloses a communications device used in a wireless communications system for improving MIMO operation, the communications device includes a control circuit for realizing functions of the communications device, a central processing unit installed in the control circuit for executing a program code to operate the control circuit, and a memory coupled to the central processing unit for storing the program code. The program code includes a means for assigning to hybrid automatic repeat request (HARQ) processes identifiers from 0 to $((N_{proc}/2)-1)$ and from 8 to $((N_{proc}/2)+7)$, wherein $N_{proc}$ represents a number of HARQ processes in a HARQ procedure for the communications device and $N_{proc}$ is an even integer.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
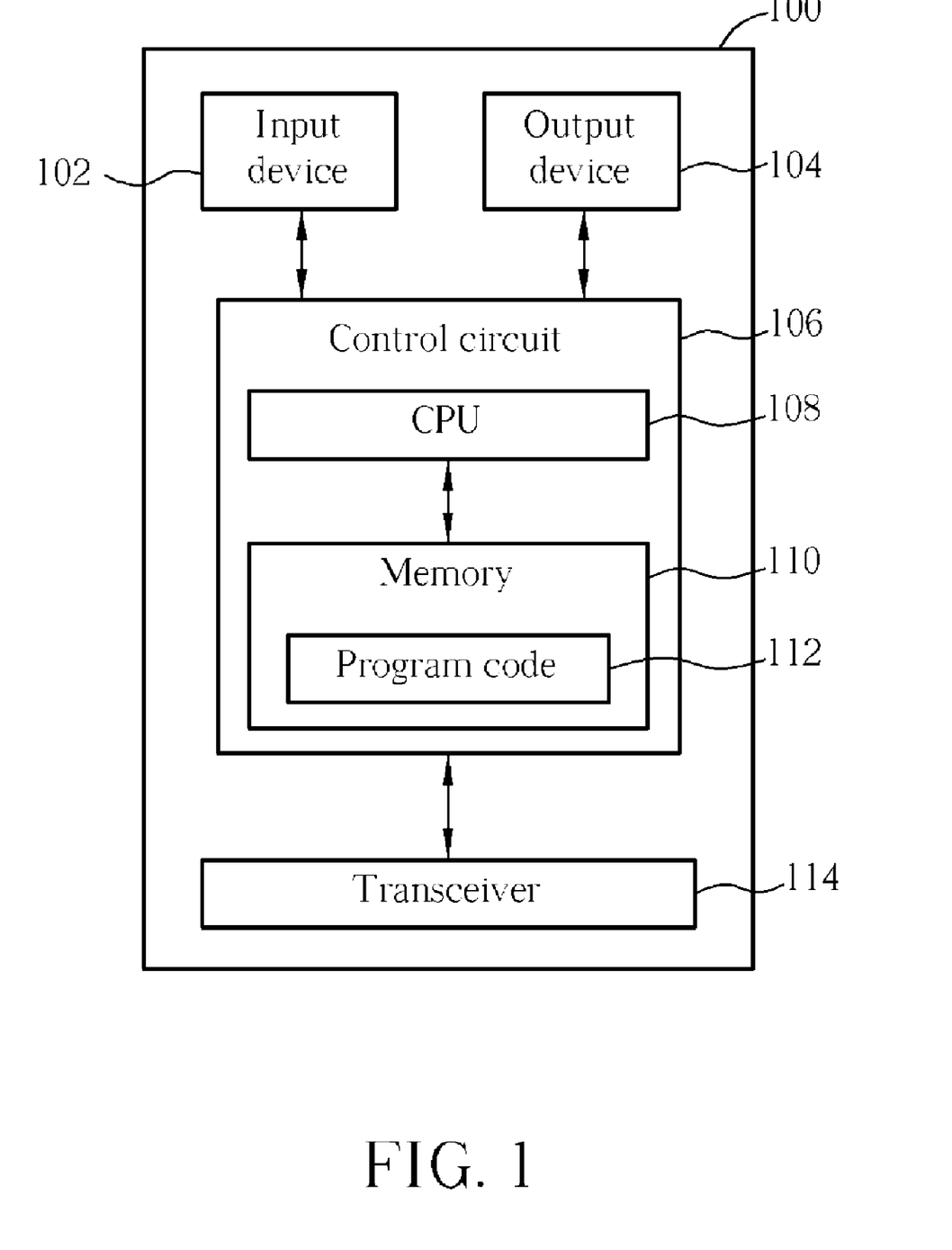
FIG. 1 is a functional block diagram of a communications device.

Please refer to FIG. 1, which is a functional block diagram of a communications device 100. For the sake of brevity, FIG. 1 only shows an input device 102, an output device 104, a control circuit 106, a central processing unit (CPU) 108, a memory 110, a program code 112, and a transceiver 114 of the communications device 100. In the communications device 100, the control circuit 106 executes the program code 112 in the memory 110 through the CPU 108, thereby controlling an operation of the communications device 100. The communications device 100 can receive signals input by a user through the input device 102, such as a keyboard, and can output images and sounds through the output device 104, such as a monitor or speakers. The transceiver 114 is used to receive and transmit wireless signals, deliver received signals to the control circuit 106, and output signals generated by the control circuit 106 wirelessly. From a perspective of a communications protocol framework, the transceiver 114 can be seen as a portion of Layer 1, and the control circuit 106 can be utilized to realize functions of Layer 2 and Layer 3. Preferably, the communications device 100 is utilized in a High Speed Package Access (HSPA) system of the third generation (3G) mobile communications system, supporting a MIMO operation.

Figure 2:
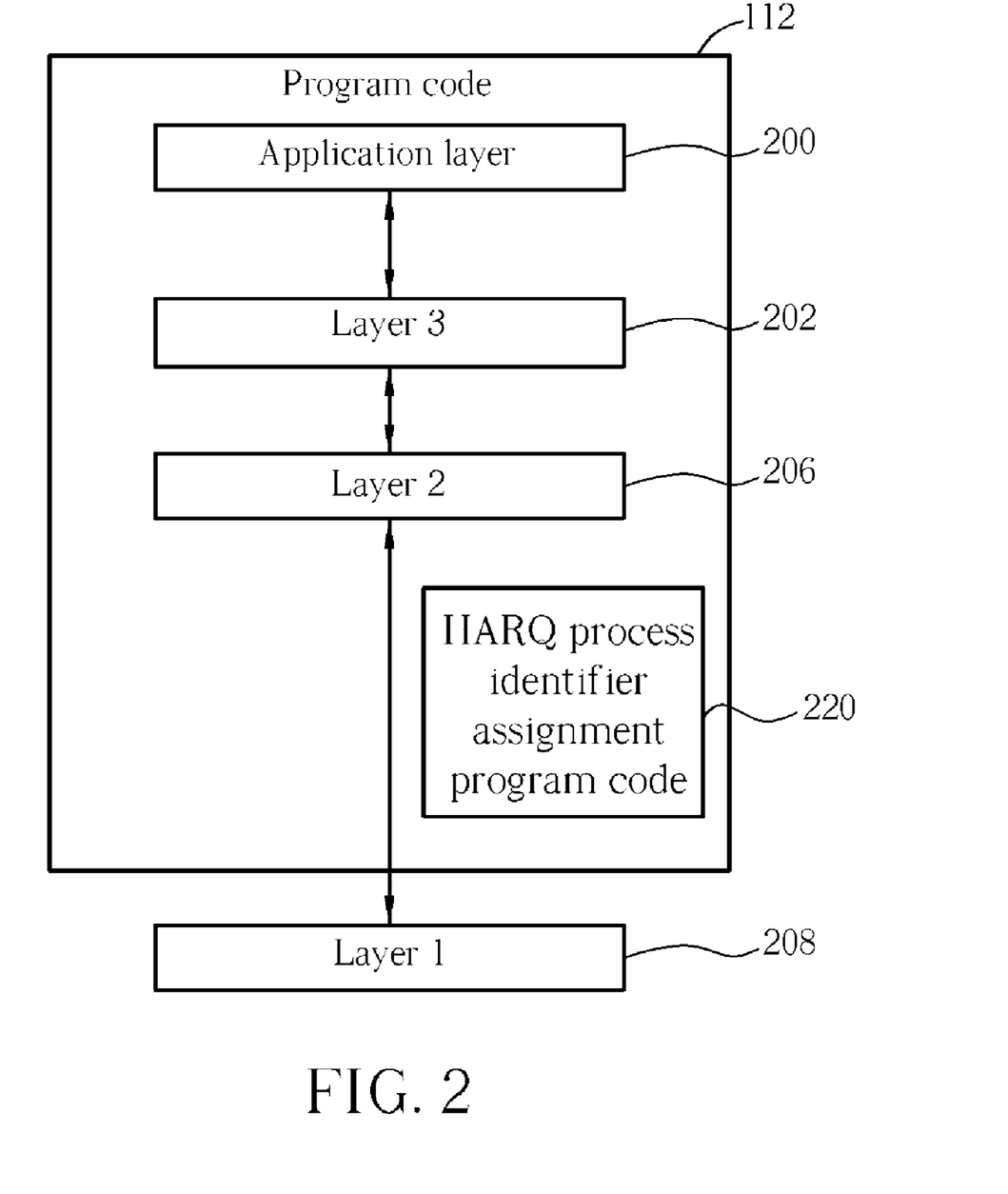
FIG. 2 is a diagram of the program code shown in FIG. 1.

Please continue to refer to FIG. 2. FIG. 2 is a diagram of the program code 112 shown in FIG. 1. The program code 112 includes an application layer 200, a Layer 3 202, and a Layer 2 206, and is coupled to a Layer 1 208. The Layer 3 202 is for performing radio resource control (RRC). The Layer 2 206 is for performing link control, and the Layer 1 208 is a physical layer.

As mentioned previously, when a UE is configured in the MIMO operation, the UE can receive two transport blocks on a HS-PDSCH in one TTI and a number of HARQ processes of a HARQ procedure increases to 16 at most. In addition, if a number of the HARQ processes of the HARQ procedure of the UE is $N_{proc}$, the UE assigns HARQ process identifiers of the $N_{proc}$ HARQ processes for 0 to $(N_{proc}-1)$. In this situation, the embodiment of the present invention provides a HARQ process identifier assignment program code 220 for the program code 112 in the Layer 1 208, which improves the MIMO operation according to a configuration of a HARQ process identifier corresponding to a secondary transport block.

Figure 3:
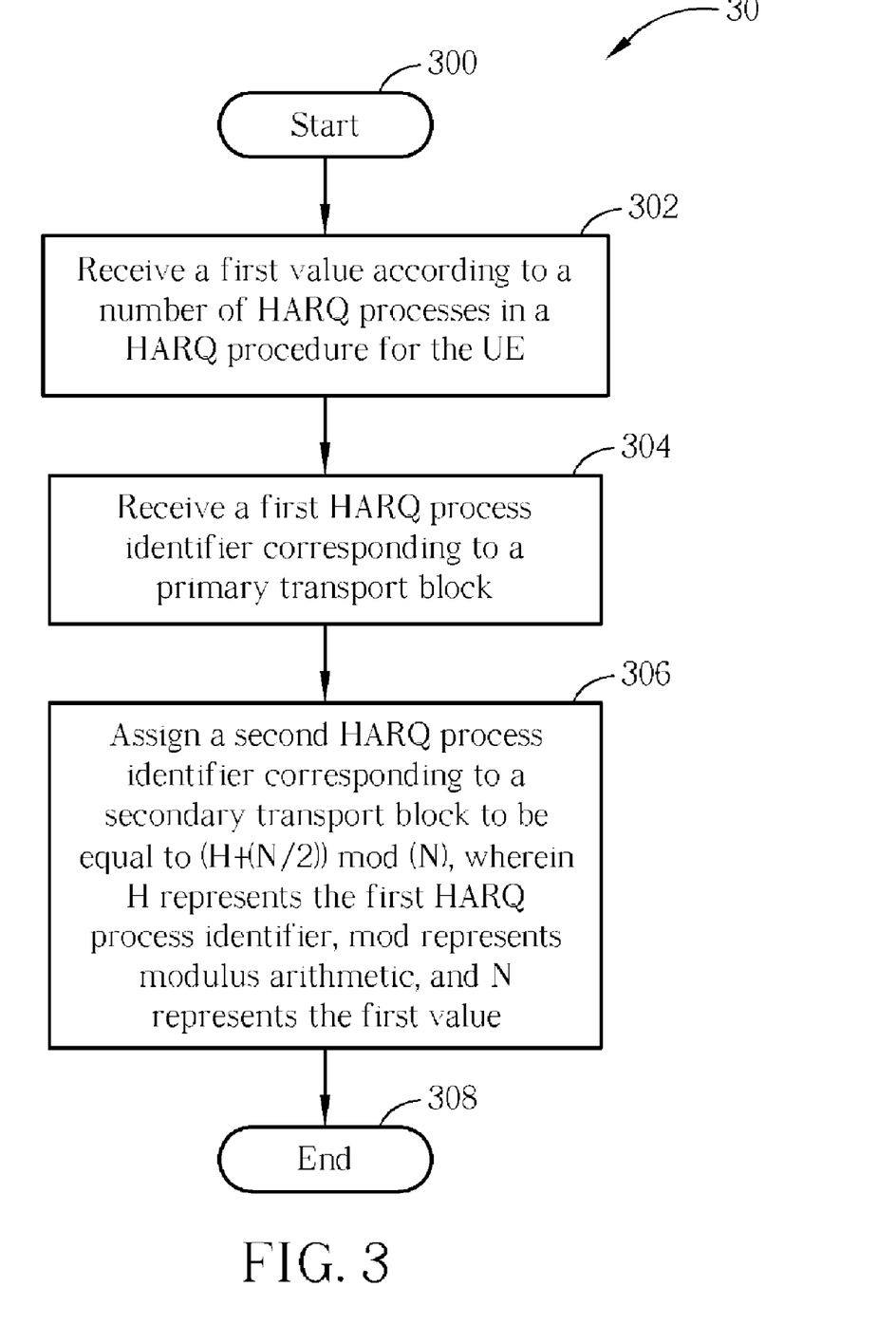
FIG. 3 to FIG. 6 are schematic diagrams of a process according to an embodiment of the present invention.

Please refer to FIG. 3, which illustrates a schematic diagram of a process 30 according to an embodiment of the present invention. The process 30 is utilized for improving MIMO operation for a UE in a wireless communications system. The process 30 can be compiled into the HARQ process identifier assignment program code 220. The process 30 includes the following steps:

Step 300: Start.

Step 302: Receive a first value according to a number of HARQ processes in a HARQ procedure for the UE.

Step 304: Receive a first HARQ process identifier corresponding to a primary transport block.

Step 306: Assign a second HARQ process identifier corresponding to a secondary transport block to be equal to (H+(N/2)) mod (N), wherein H represents the first HARQ process identifier, mod represents modulus arithmetic, and N represents the first value.

Step 308: End.

According to the process 30, the embodiment of the present invention assigns the second HARQ process identifier corresponding to the secondary transport block to be equal to (H+(N/2)) mod (N), wherein H represents the first HARQ process identifier, mod represents modulus arithmetic, and N represents the first value, which relates to the number of the HARQ processes of the HARQ procedure for the UE, $N_{proc}$. Preferably, H is an integer between 0 and 15. In this situation, if $N_{proc}$ is an even integer between 2 and 16, the embodiment of the present invention defines N=$N_{proc}$. If $N_{proc}$ is an odd integer between 3 and 15, the embodiment of the present invention defines N=$N_{proc}$−1, and moreover, when H is equal to N, the UE assigns a second HARQ process identifier N to the HARQ process for the secondary transport block.

For example, if $N_{proc}$=10, the second HARQ process identifiers that are mapped to the first HARQ process identifiers 0, 1, 2, 3, 4 are respectively 5, 6, 7, 8, 9. If $N_{proc}$=11, the second HARQ process identifier that is mapped to the first HARQ process identifier 10 is 10, that is, the HARQ process with the HARQ process identifier 10 is only used for the primary transport block.

In the prior art, even if the UE is configured in the MIMO operation, the second HARQ process identifier corresponding to the secondary transport block is given by ((H+8) mod 16) when the first HARQ process identifier corresponding to the primary transport block is H. In other words, if $N_{proc}$≦8, the number of the HARQ processes that are used for receiving the secondary transport blocks is still 0, so as to reduce the effect of the MIMO operation. In comparison with the prior art, according to the process 30, when the UE is configured in the MIMO operation, the UE assigns the second HARQ process identifier according to the first value, N, and the first HARQ process identifier, H. Therefore, the UE can receive the secondary transport blocks and will not be dependent on the number of the HARQ processes. According to the process 30, even if $N_{proc}$≦8, the UE can assign the second HARQ process identifier corresponding to the secondary transport block so as to receive two transport blocks on the HS-PDSCH in one TTI.

Figure 4:
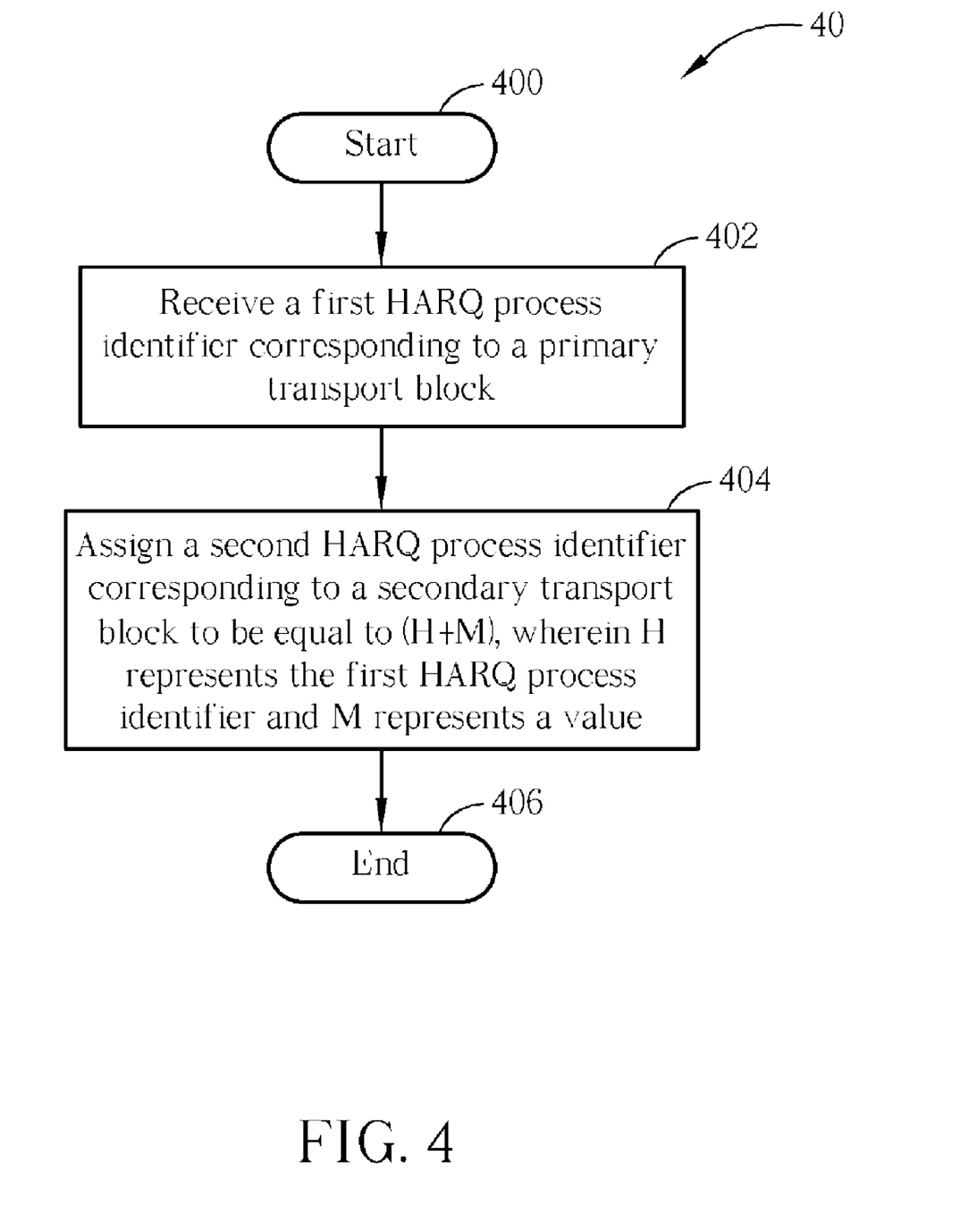
Figure 5:
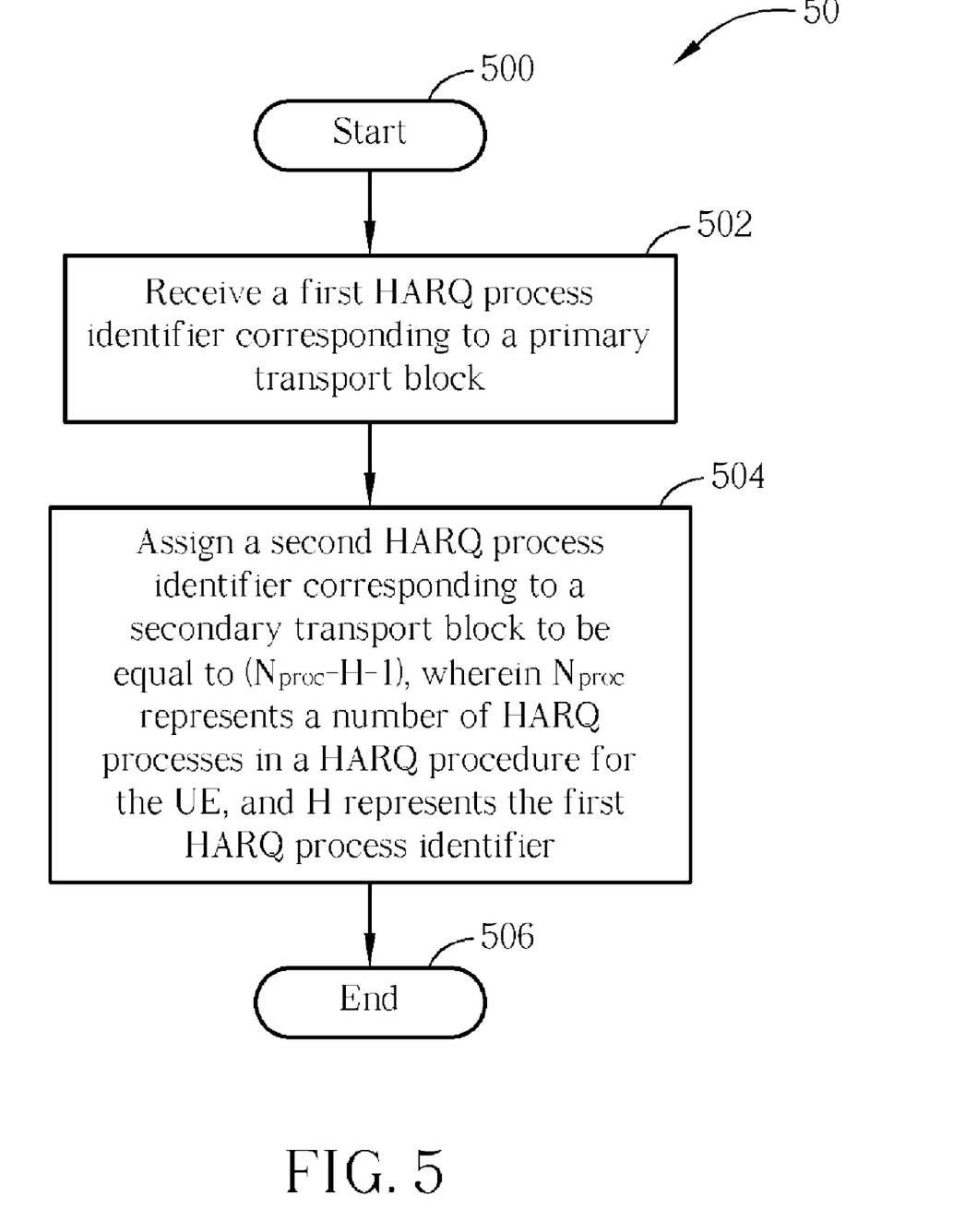

In addition, the embodiment of the present invention further provides a process 40 and a process 50 for assigning the second HARQ process identifier corresponding to the secondary transport block, for improving MIMO operation for the UE. The process 40 or the process 50 can be compiled into the HARQ process identifier assignment program code 220. Please refer to FIG. 4, which illustrates a schematic diagram of the process 40 according to an embodiment of the present invention. The process 40 includes the following steps:

Step 400: Start.

Step 402: Receive a first HARQ process identifier corresponding to a primary transport block.

Step 404: Assign a second HARQ process identifier corresponding to a secondary transport block to be equal to (H+M), wherein H represents the first HARQ process identifier and M represents a value.

Step 406: End.

According to the process 40, the embodiment of the present invention assigns the second HARQ process identifier corresponding to the secondary transport block to be equal to (H+M), wherein M is dependent on that H is even or odd. If H is an even integer between 0 and 15, M=1, so that the second HARQ process identifier is assigned to (H+1). If H is an odd integer between 0 and 15, M=−1, so that the second HARQ process identifier is assigned to (H−1). For example, if $N_{proc}$=10, the second HARQ process identifiers that are mapped to the first HARQ process identifiers 0, 2, 4, 6, 8 are respectively 1, 3, 5, 7, 9. If $N_{proc}$=11, the HARQ process with the HARQ process identifier 10 is only used for the primary transport block.

Please refer to FIG. 5, which illustrates a schematic diagram of the process 50 according to an embodiment of the present invention. The process 50 includes the following steps:

Step 500: Start.

Step 502: Receive a first HARQ process identifier corresponding to a primary transport block.

Step 504: Assign a second HARQ process identifier corresponding to a secondary transport block to be equal to ($N_{proc}$−H−1), wherein $N_{proc}$ represents a number of HARQ processes in a HARQ procedure for the UE, and H represents the first HARQ process identifier.

Step 506: End.

According to the process 50, the embodiment of the present invention assigns the second HARQ process identifier corresponding to the secondary transport block to be equal to ($N_{proc}$−H−1), wherein H is an integer between 0 and 15. For example, if $N_{proc}$=10, the second HARQ process identifiers that are mapped to the first HARQ process identifiers 0, 1, 2, 3, 4 are respectively 9, 8, 7, 6, 5. If $N_{proc}$=11, the HARQ process with the HARQ process identifier 5 is only used for the primary transport block.

Therefore, even if $N_{proc}$≦8, the UE can assign the second HARQ process identifier corresponding to the secondary transport block according the process 30, 40 or 50, so as to receive two transport blocks on the HS-PDSCH in one TTI.

Figure 6:
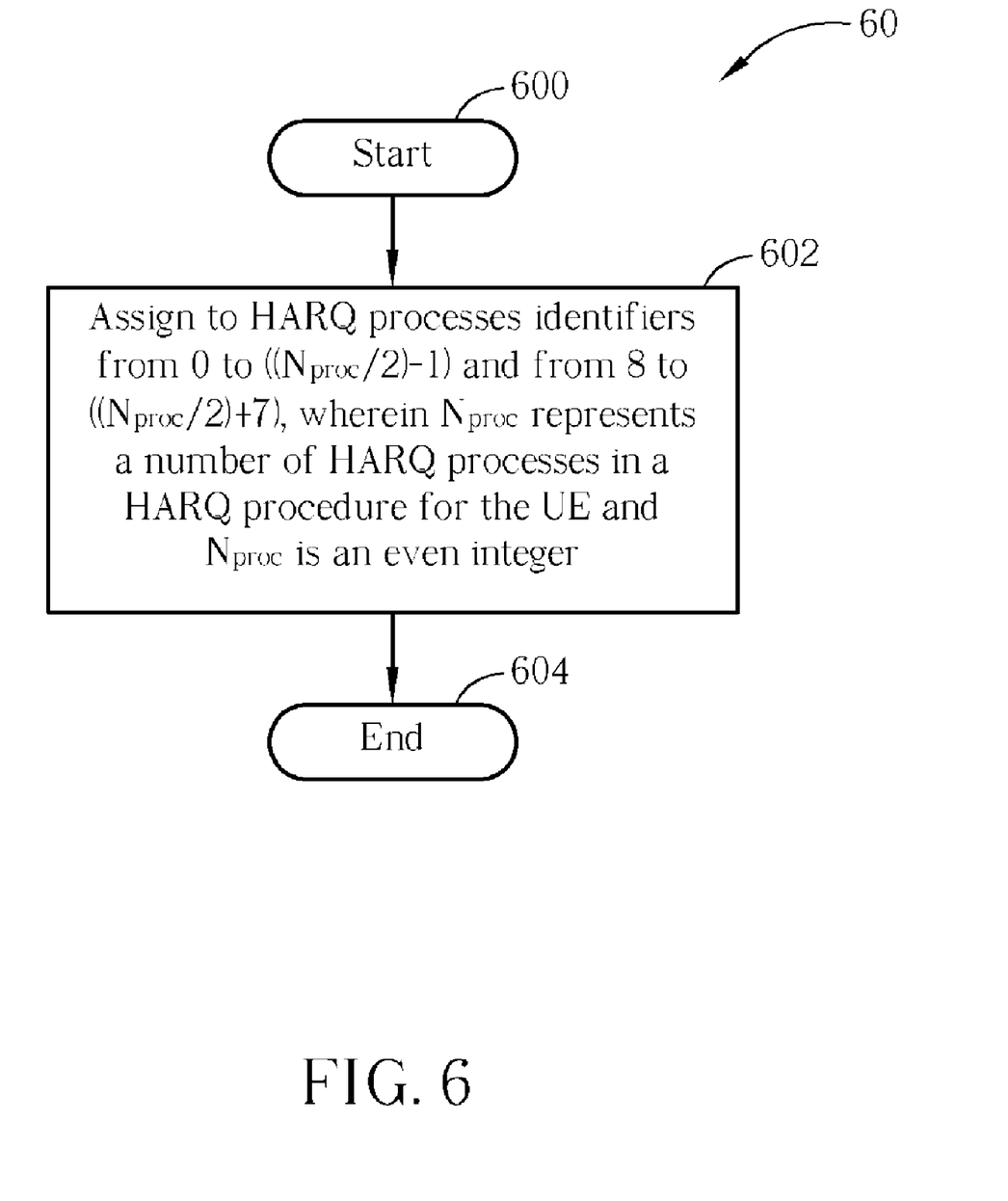

Moreover, please refer to FIG. 6, which illustrates a schematic diagram of the process 60 according to an embodiment of the present invention. The process 60 includes the following steps:

Step 600: Start.

Step 602: Assign to HARQ processes identifiers from 0 to (($N_{proc}$/2)−1) and from 8 to (($N_{proc}$/2)+7), wherein $N_{proc}$ represents a number of HARQ processes in a HARQ procedure for the UE and $N_{proc}$ is an even integer.

Step 604: End.

According to the process 60, when the UE is configured in the MIMO operation, the embodiment of the present invention assigns the HARQ process identifiers from 0 to (($N_{proc}$/2)−1) and from 8 to (($N_{proc}$/2)+7) according to $N_{proc}$. Preferably, $N_{proc}$ is an even integer. For example, if $N_{proc}$=10, the HARQ process identifiers are assigned from 0 to 4 and 8 to 12.

In the prior art, the second HARQ process identifier corresponding to the secondary transport block is given by ((H+8)

mod 16) when the first HARQ process identifier corresponding to the primary transport block is H, in addition, the HARQ process identifiers can only be assigned from 0 to ($N_{proc}-1$). As mentioned previously, if $N_{proc} \leq 8$, the number of the HARQ processes that are used for receiving the secondary transport blocks is still 0. Even if $N_{proc} \geq 8$, the configuration of the HARQ processes that are used for receiving the secondary transport blocks is not efficient enough.

In comparison with the prior art, the embodiment of the present invention assigns the HARQ process identifiers from 0 to (($N_{proc}/2)-1$) and from 8 to (($N_{proc}/2)+7$) according to $N_{proc}$ such that every HARQ process mapped to the primary transport block has a corresponding HARQ process mapped to the secondary transport block. Therefore, the embodiment of the present invention can enhance the transmission rate so as to improve the MIMO operation.

In conclusion, the embodiment of the present invention assigns the second HARQ process identifier corresponding to the secondary transport block according to the number of the HARQ processes and the first HARQ process identifier corresponding to the primary transport block. On the other hand, the embodiment of the present invention assigns the HARQ process identifiers to an appropriate range for increasing the number of the HARQ processes that are used for received the secondary transport blocks, so as to improve the MIMO Operation.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of improving multi-input multi-output operation (MIMO) for a user equipment (UE) in a wireless communications system, the method comprising:
   receiving a first value according to a number of hybrid automatic repeat request (HARQ) processes in a HARQ procedure for the UE and the number of the HARQ processes is an even integer between 2 and 16;
   receiving a first HARQ process identifier corresponding to a primary transport block; and
   assigning a second HARQ process identifier corresponding to a secondary transport block to be equal to (H+(N/2)) mod (N);
   wherein H represents the first HARQ process identifier, mod represents modulus arithmetic, and N equals to the number of the HARQ processes in the HARQ procedure for the UE.

2. The method of claim 1, wherein H is an integer between 0 and 15.

3. A method of improving multi-input multi-output operation, abbreviated to MIMO, for a user equipment, called UE hereinafter, in a wireless communications system, the method comprising:
   receiving a first value according to a number of hybrid automatic repeat request (HARQ) processes in a HARQ procedure for the UE;
   receiving a first HARQ process identifier corresponding to a primary transport block; and
   assigning a second HARQ process identifier corresponding to a secondary transport block to be equal to (H+(N/2)) mod (N);
   wherein H represents the first HARQ process identifier, mod represents modulus arithmetic, and N represents the first value, wherein receiving N according to the number of the HARQ processes in the HARQ procedure for the UE comprises making N equal to the number of the HARQ processes in the HARQ procedure for the UE minus 1 when the number of the HARQ processes is an odd integer between 3 and 15.

4. The method of claim 3 further comprising making the second HARQ process identifier equal to H when H is equal to N.

5. The method of claim 3, wherein H is an integer between 0 and 15.

6. A communications device used in a wireless communications system for improving multi-input multi-output operation, abbreviated to MIMO, the communications device comprising:
   a control circuit for realizing functions of the communications device;
   a central processing unit installed in the control circuit for executing a program code to operate the control circuit; and
   a memory coupled to the central processing unit for storing the program code;
   wherein the program code comprises:
      receiving a first value according to a number of hybrid automatic repeat request (HARQ) processes in a HARQ procedure for the communications device and the number of the HARQ processes is an even integer between 2 and 16;
      receiving a first HARQ process identifier corresponding to a primary transport block; and
      assigning a second HARQ process identifier corresponding to a second transport block to be equal to (H+(N/2)) mod (N);
      wherein H represents the first HARQ process identifier, mod represents modulus arithmetic, and N is equal to the number of the HARQ processes in the HARQ procedure for the UE.

7. The communications device of claim 6, wherein H is an integer between 0 and 15.

8. A communications device used in a wireless communications system for improving multi-input multi-output operation, abbreviated to MIMO, the communications device comprising:
   a control circuit for realizing functions of the communications device;
   a central processing unit installed in the control circuit for executing a program code to operate the control circuit; and
   a memory coupled to the central processing unit for storing the program code;
   wherein the program code comprises:
      receiving a first value according to a number of hybrid automatic repeat request (HARQ) processes in a HARQ procedure for the communications device;
      receiving a first HARQ process identifier corresponding to a primary transport block; and
      assigning a second HARQ process identifier corresponding to a secondary transport block to be equal to (H+(N/2)) mod (N);
      wherein H represents the first HARQ process identifier, mod represents modulus arithmetic, and N represents the first value, wherein when the number of the HARQ processes in the HARQ procedure for the communications device is an odd integer between 3 and 15, N is equal to the number of the HARQ processes in the HARQ procedure for the communications device minus 1.

9. The communications device of claim 8, wherein the program code further comprising making the second HARQ process identifier equal to H when H is equal to N.

10. The communications device of claim 8, wherein H is an integer between 0 and 15.

11. A method of improving multi-input multi-output operation, abbreviated to MIMO, for a user equipment, called UE hereinafter, in a wireless communications system, the method comprising:
   receiving a first hybrid automatic repeat request (HARQ) process identifier corresponding to a primary transport block; and
   assigning a second HARQ process identifier corresponding to a secondary transport block to be equal to (H+M);
   wherein H represents the first HARQ process identifier and M is equal to 1 when H is an even integer between 0 and 15 and M is equal to −1 when H is an odd integer between 0 and 15.

12. A communications device used in a wireless communications system for improving multi-input multi-output operation, abbreviated to MIMO, the communications device comprising:
   a control circuit for realizing functions of the communications device;
   a central processing unit installed in the control circuit for executing a program code to operate the control circuit; and
   a memory coupled to the central processing unit for storing the program code;
   wherein the program code comprises:
      receiving a first hybrid automatic repeat request (HARQ) process identifier corresponding to a primary transport block; and
      assigning a second HARQ process identifier corresponding to a secondary transport block to be equal to (H+M); wherein H represents the first HARQ process identifier and M is equal to 1 when H is an even integer between 0 and 15 and M is equal to −1 when H is an odd integer between 0 and 15.

* * * * *